US008440778B2

(12) United States Patent
Rushing et al.

(10) Patent No.: US 8,440,778 B2
(45) Date of Patent: May 14, 2013

(54) POLYUREASULFONE POLYMER (75) Inventors: Rock Austin Rushing, Spicewood, TX (US); George Phillip Hansen, Austin, TX (US); John Werner Bulluck, Spicewood, TX (US)

(73) Assignee: Texas Research International, Inc., Austin, TX (US)

( * ) Notice: Subject to any disclaimer, the term of this patent is extended or adjusted under 35 U.S.C. 154(b) by 0 days.

(21) Appl. No.: 13/151,026

(22) Filed: Jun. 1, 2011

(65) Prior Publication Data
US 2011/0301317 A1 Dec. 8, 2011

Related U.S. Application Data (60) Provisional application No. 61/350,704, filed on Jun. 2, 2010.

(51) Int. Cl.
*C08G 18/10* (2006.01)
(52) U.S. Cl.
USPC .............................................. 528/68; 528/85
(58) Field of Classification Search .................... 528/85, 528/68
See application file for complete search history.

(56) References Cited

U.S. PATENT DOCUMENTS 2,888,438 A * 5/1959 Katz ............................... 528/52
3,767,756 A 10/1973 Blades
3,869,429 A 3/1975 Blades

OTHER PUBLICATIONS

"Polyurea with Large Positive Birefringence for Second Harmonic Generation", Miyata et al. Macromolecules 1996, 28, 2637-2643.*
Encyclopehdia of Astrobiology. Ed. Gargaud Muriel, etc. ISBN: 978-3-642-11271-3, p. 1172.*
Sheth, Jignesh P. et al; Role of Chain Symmetry and Hydrogen Bonding in Segmented Copolymers With Monodisperse Hard Segments; Polymer 46: 7317-7322, 2005.
European Patent Office; International Search Report and Written Opinion; PCT Application No. PCT/US2011/038784; Oct. 28, 2011.
Ye, Cheng, et al; Blue Second Harmonic Generation and Temporal Stability of Polyureasulfone Films Prepared by Polymerization During Poling; Proceedings of SPIE, vol. 2897, Jan. 1, 1996, pp. 183-190.
Ye, Sunjie, et al.; Praseodymium/Polyureasulfone Complexes With Unusual Thermal, Luminescent and Magnetic Properties; Macromolecular Chemistry and Physics, Apr. 6, 2010.
European Patent Office; Second Written Opinion; PCT Application No. PCT/US2011/038784; May 22, 2012.

* cited by examiner

*Primary Examiner* — Michael L Leonard
(74) *Attorney, Agent, or Firm* — Jackson Walker L.L.P.

(57) ABSTRACT

A polyureasulfone polymer having a high cohesive energy density and tensile strength, and method of making.

4 Claims, 9 Drawing Sheets

POLYUREASULFONE POLYMER

This application claims priority to U.S. Provisional Patent Application Ser. No. 61/350,704, filed on Jun. 2, 2010, entitled NOVEL POLYUREASULFONE POLYMER, the entire content of which is hereby incorporated by reference.

FIELD OF THE INVENTION

The present invention relates generally to the field of high-strength polymeric fibers, and more specifically to a polyureasulfone polymer having a high cohesive energy density and tensile strength.

BACKGROUND

Development of improved high-strength polymeric fibers able to provide ballistic protection beyond conventional fibers has met with limited success. The developmental fiber poly(p-phenylene-2,6-benzobisoxazole) (PBO, Zylon®), which showed early promise in terms of strength, was later found to have poor aging and hydrolytic instability issues that severely compromised long-term effectiveness. Manufacturing rigid-rod polymers such as PBO and poly{diimidazo pyridinylene (dihydroxy) phenylene} (PPID, M5®) also presents significant processing obstacles. These include unavailability or oxidative instability of the starting materials, and removal of acidic residues and byproducts from the drawn fiber, which have been implicated in the poor hydrolytic stability of PBO (O'Neil. 2006). Recently investigated modifications of the PBO and PPID polymer backbones may increase intermolecular hydrogen bonding that could in turn potentially result in improved strengths (U.S. Pat. No. 3,767,756 to Blades; U.S. Pat. No. 3,869,429 to Blades).

Figure 1:
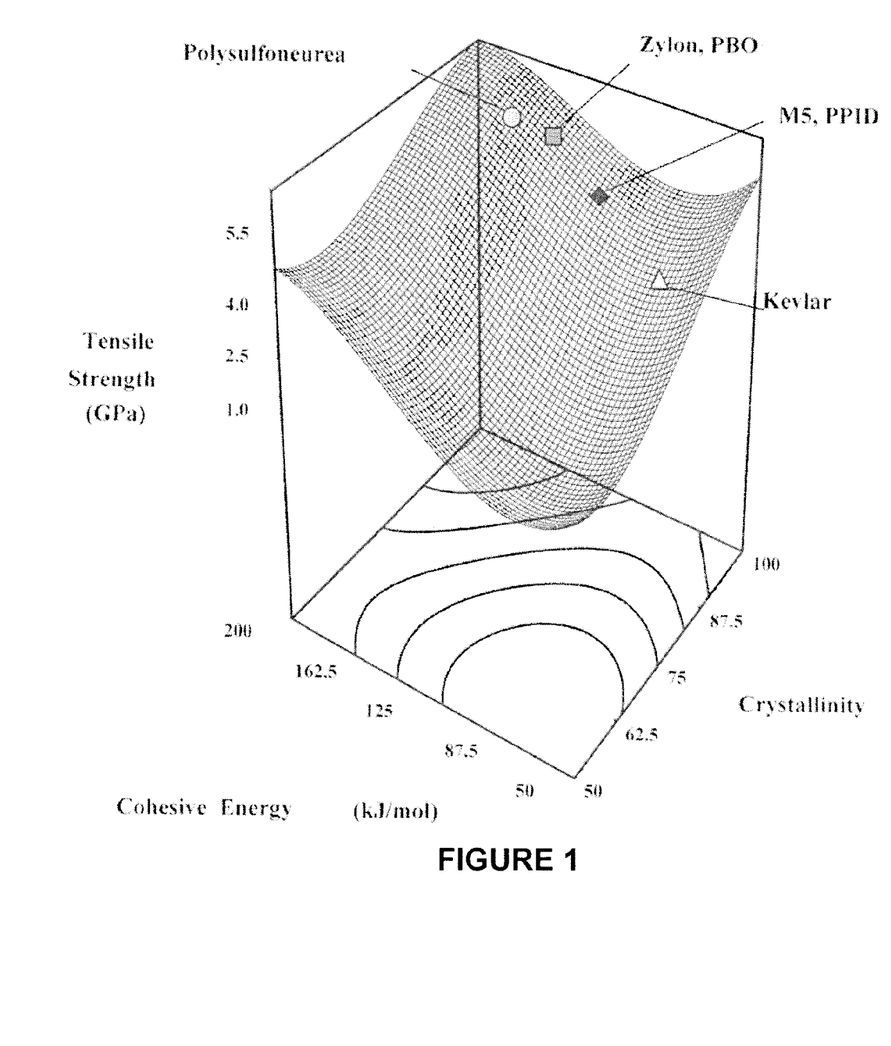
FIG. 1 shows cohesive energy density for various materials, including an embodiment of the present invention ("polysulfoneurea")

Obtaining high strengths in organic fibers is dependent on the molecular weight, crystallinity, or molecular orientation of the constituent polymer, and its cohesive energy density. Highly ordered polymer fibers are obtained by optimization of the fiber drawing process. The magnitude of the cohesive energy density (CED) is driven by attractions between adjacent polymer molecules, which include dispersive, electrostatic, and hydrogen bonding forces. The most robust fibers will possess high relative crystallinity and an elevated CED. FIG. 1 illustrates the relationship between cohesive enemy, crystallinity, and tensile strength in selected polymers.

Polyurea coatings and composites have been gaining acceptance in ballistic and blast applications over the past several years. Additional evidence has emerged to indicate polyureas have superior performance compared to polyurethanes, particularly in response to blast and ballistic forces. This difference may be due to a higher number of hydrogen bonds in polyurea materials compared to polyurethanes. A recent report (Sheth et al., 2005) supports this supposition. Intermolecular cohesive forces are expected to be higher than those obtained in para-aramid synthetic fibers (e.g. Kevlar®), PBO and PPID based on preliminary modeling and calculations of cohesive energy density.

SUMMARY

The present invention relates to a novel polymer with improved cohesive energy density relative to conventional polymers, and which exhibits improved tensile strength when used to form a fiber. In an embodiment of the invention, the polymer is a polyureasulfone polymer.

In one embodiment, the invention may comprise a polyureasulfone polymer comprising units of paraphenylene-diisocyante (PDI) and diaminodiphenylsulfone (DADPS) linked via sulfone linkages to form a polymer. The number-averaged molecular weight of aromatic polyurea fiber may be greater that 10,000 g/mol.

Another embodiment of the present invention provides a method of synthesizing a polyureasulfone polymer material.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

The present invention relates to a novel polymer with improved cohesive energy density relative to conventional polymers, and which exhibits improved tensile strength when used to form a fiber. In an embodiment of the invention, the polymer is a polyureasulfone polymer.

Method for Producing Polyureasulfone Polymer Composition

In one embodiment, the present invention comprises the synthesis of fiber-forming polymers from aromatic diisocyanates and diamines containing sulfone groups and ether linkages in the backbone of the diamine. These fiber-forming polymers may be polyurea-linked polymers containing sulfone or ether linkages in the backbone of the polymer. The sulfone or ether linkages in the backbone of the polymer confer advantageous properties relating to cohesive energy, including increased stability.

In an embodiment of the present invention, the following reaction scheme is carried out:

OCN—R—NCO+H$_2$N-R'—NH$_2$+H$_2$N—R''—NH$_2$+H$_2$N-R'''—NH$_2$+etc.→OCN—R—(CO)NFI-R'—(CO)NH—R''—(CO)NFIR'''—(etc)—NH$_2$ wherein the relative proportions of R', R'' and R''' diamines are each varied from 0 to 100% of the total mixture of diamines, such that the stoichiometry remains balanced with the total diisocyanate content of the reaction mixture. The ratio of diamine to diisocyante in the reaction mixture, may, for example, be approximately 1:1. Similarly, the composition of diisocyantes could be varied to include mixtures in order to offer further flexibility in tailoring the properties of the final polymer product. Examples of diisocyantes and diamines contemplated in the present invention are shown in Table 1.

TABLE 1

Exemplary reagents that may be used for polyureasulfone polymer formation

|  | MPt (° C.) | CAS |
|---|---|---|
| Diisocyanates | | |
| 1,4-Phenylene diisocyanate | 96-99 | 104-49-4 |
| 1,3-Phenylene diisocyanate | 49-51 | 123-61-5 |
| 4,4'-Methylenediphenyl diisocyanate | 40-45 | 101-68-8 |
| 3,3'-Dimethyl-4,4'-biphenylene isocyanate | 130-135 | 91-97-4 |
| Diamines | | |
| MOCA-A: 4,4'-Methylene-bis (2-chloroaniline) | 102-108 | 101-14-4 |
| HAB: 3,3'-Dihydroxy-4,4'-diaminobiphenyl | — | 2373-98-0 |
| 2,2'-Bis (4-[4-aminophenoxy] phenyl) sulfone | 192 | 13080-89-2 |
| 4,4'-ODA: 4,4'-Oxydianiline | 191.5< | 101-80-4 |
| 3,4'-ODA: 3,4'-Oxydianiline | 67-71 | 2657-87-6 |

TABLE 1-continued

Exemplary reagents that may be used for polyureasulfone polymer formation

|  | MPt (° C.) | CAS |
|---|---|---|
| ASD: 4,4'-Diaminodiphenyl sulfide | 108< | 139-65-1 |
| 4,4'-DDS: 4,4'-Diaminodiphenyl sulfone | 176< | 80-08-0 |
| o-Tolidine sulfone | Decomp. ~300 | 71226-58-9 |
| DABA: 4,4'-Diaminobenzanilide | 204< | 785-30-8 |
| o-Tolidine disulfonic acid | — | 83-83-0 |

The identity of the diamine and the diisocyanate should be chosen such that a repeating polyurea linkage repeats along the polymer backbone, providing high thermal stability and cohesive energy in the product. This condition will be satisfied by the diamines and diisocyantes listed in Table 1, or by other possible diamines and diisocyantes. In one embodiment of the invention, the diisocyante is paraphenylene-diisocyante (PDI) and the diamine is diaminodiphenylsulfone (DADPS) oro-toluidine.

Polyureasulfone Polymer Composition

In one embodiment, the invention may comprise a polyureasulfone polymer comprising units of paraphenylene-diisocyante (PDI) and diaminodiphenylsulfone (DADPS) linked via sulfone linkages to form a polymer. The number-averaged molecular weight of aromatic polyurea fiber may be greater than 10,000 g/mol.

In another embodiment, the polyureasulfone polymer may comprise the following structure:

The polyureasulfone polymer may include n polymer units, wherein n has a value greater than 200, preferable greater than 270.

In an embodiment of the invention, the poly ureasulfone polymer material comprises a series of intermolecular, hydrogen bonds. In this embodiment, the hydrogen bonds may have energies greater than 20 kJ/mol, preferably approximately 21.8 kJ/mol. In this embodiment, fibers of the material are capable of being reaction extruded, and produce a fiber with a higher stiffness than para-aramid synthetic fibers.

The polyureasulfone polymer may form intermolecular hydrogen bonds forming the following structure:

In an embodiment of the invention, the polyureasulfone polymer may have a cohesive energy of greater than approximately 150 J/mol, preferably greater than or equal to approximately 158 J/mol. In this embodiment, the polyureasulfone polymer may have a tensile strength of approximately 5.0 to 6.0 GPa, and a shear yield stress of approximately 135.

In an embodiment of the present invention, the polyureasulfone polymer may exhibit dispersive bi-dentate bi-directional hydrogen bonding. Without wishing to be bound by theory, this inter-molecular bonding may contribute to the high cohesive energy density and tensile strength of the polyureasulfone polymer.

Example 1

Cohesive energy density was calculated for an embodiment of the present invention ("polyurea sulfone"), as well as for PBO; PPID, and para-aramid synthetic fibers. FIG. 1 illustrates the relationship between cohesive energy, crystallinity, and tensile strength in selected polymers. Cohesive energy densities were calculated using the Materials Studio™ molecular modeling software package. Cohesive energy densities were calculated based on polymer structure entered by the user.

Figure 2:
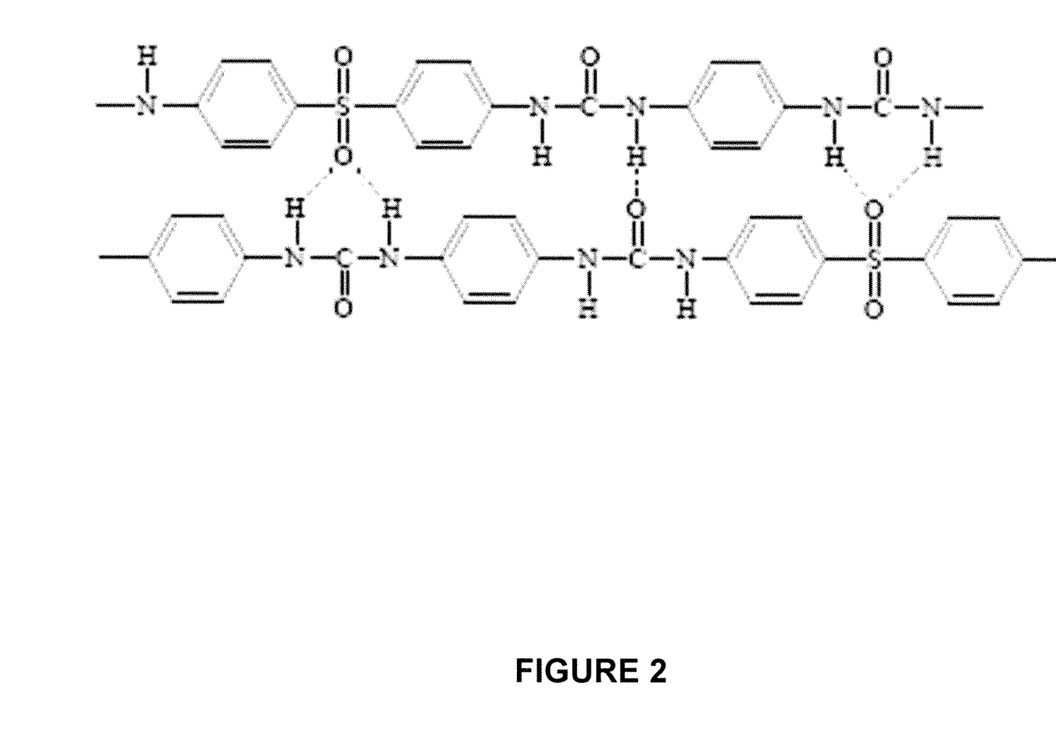
FIG. 2 shows the molecular structure of a polysulfoneurea in an embodiment of the present invention.

A polyureasulfone polymer has been identified which has a high cohesive energy density and a predicted tensile strength well in excess of para-aramid synthetic fibers, and greater than or equal to PBO or PPID. FIG. 2 shows the molecular structure of this polymer. It can be seen that hydrogen bonding causes the high cohesive energy density of this polymer. This polymer is highly hydrogen bonded and crystalline, and has very high hydrogen bond density resulting in high cohesive energy density. Another advantage of the aromatic polyurea polymer is that the synthetic process does not produce a co-product.

Example 2

Figure 3:
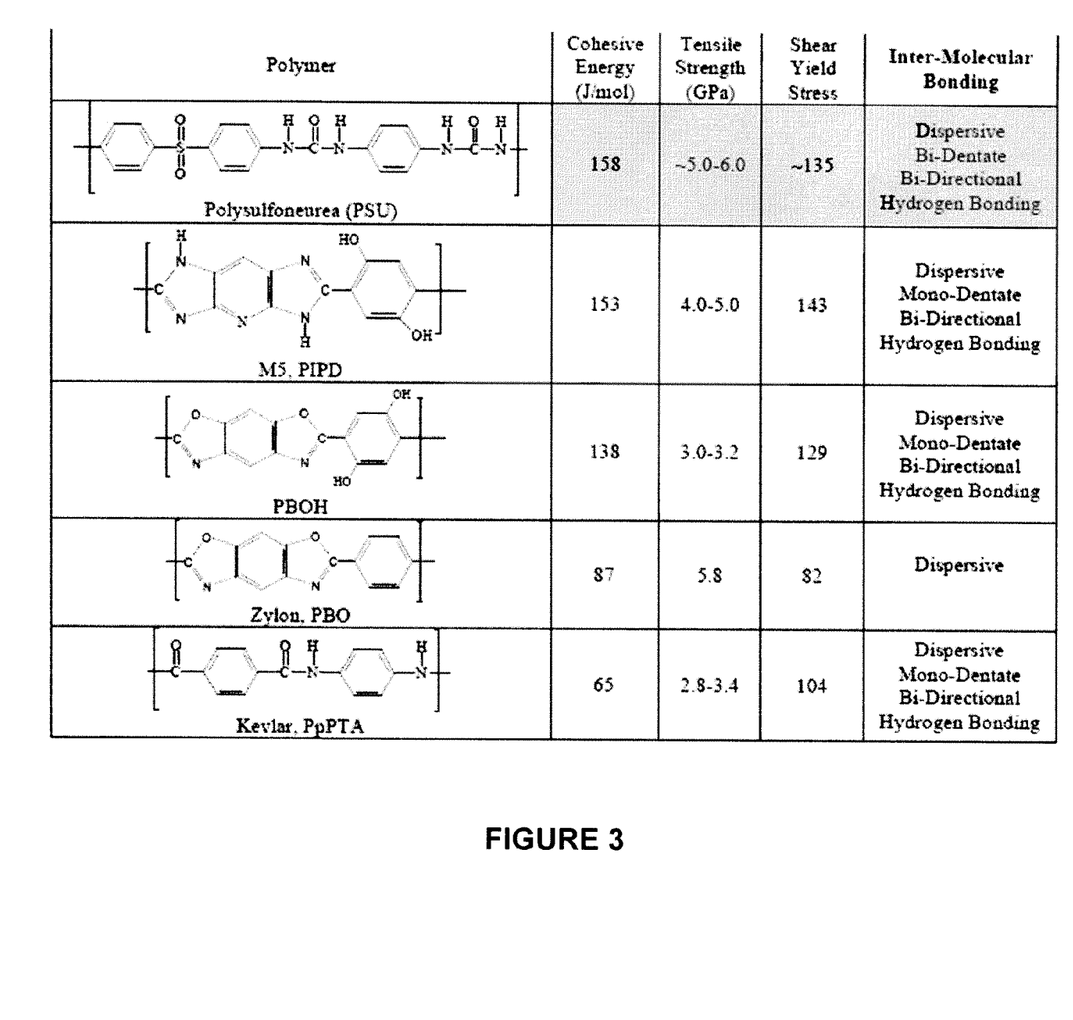
FIG. 3 shows physical properties of several high performance fibers, including a polysulfoneurea in an embodiment of the present invention.

Physical properties of a polysufoneurea in an embodiment of the present invention are shown in FIG. 3, and contrasted with physical properties of several high performance fibers. The polysulfoneurea of the present invention demonstrates increased cohesive energy and tensile strength compared with the other high performance fibers.

Without wishing to be bound by theory, it is contemplated that the polyureasulfone polymer of the present invention has a higher cohesive energy density value and accompanying higher tensile strength because of the hydrogen bond structure of the polymer. Significantly different molecular structures exist between para-aramid synthetic fibers and aromatic polyurea based on the availability of hydrogen bonds linking the polymer chains together. The hydrogen bond structure in the currently disclosed polymer is distinct from para-aramid synthetic fibers, and in fact, it is different from any other high strength polymer. Amide linkages in general, have no center of symmetry, whereas the urea linkage is symmetrical about the plane transecting the carbonyl groups. This difference alone leads to a higher crystalline fraction in polyurea.

Similarly, PPID has a staggered arrangement of the units between neighboring chains. In both amides and urethanes, this alternating distribution of monodentate hydrogen bonds between polymer chains results in a reduced crystalline fraction, compared to symmetrical, bi-dentate hydrogen bonded polyureas. The polyurea fiber material of the present invention, with its bi-dentate hydrogen bonding, has properties superior to the aramids, which only have monodentate hydrogen bonds.

Bi-dentate urea hydrogen bonds make the polymeric chains more rigid by hindering motion around the carbonyl oxygen, whereas the monodentate urethane or amide hydrogen bond is less restrictive. The bi-dentate urea hydrogen bonds pull the polymer chains closer to one another, thereby increasing crystallinity and decreasing the free volume of the material. This results in increased stiffness and better tolerance of high temperatures. Bond energies of the monodentate and bi-dentate hydrogen bonds were estimated at 18.4 and 21.8 kJ/mole respectively. This 20% increase in bond strength results in significant improvement in the physical properties of the currently disclosed fiber. When considering the chemical bonding in para-aramid synthetic fibers, or other aramids, it was hypothesized that a similar analogy existed between the monodentate, non-symmetrical amide hydrogen bond and the bi-dentate, symmetrical urea hydrogen bond.

Figure 4:
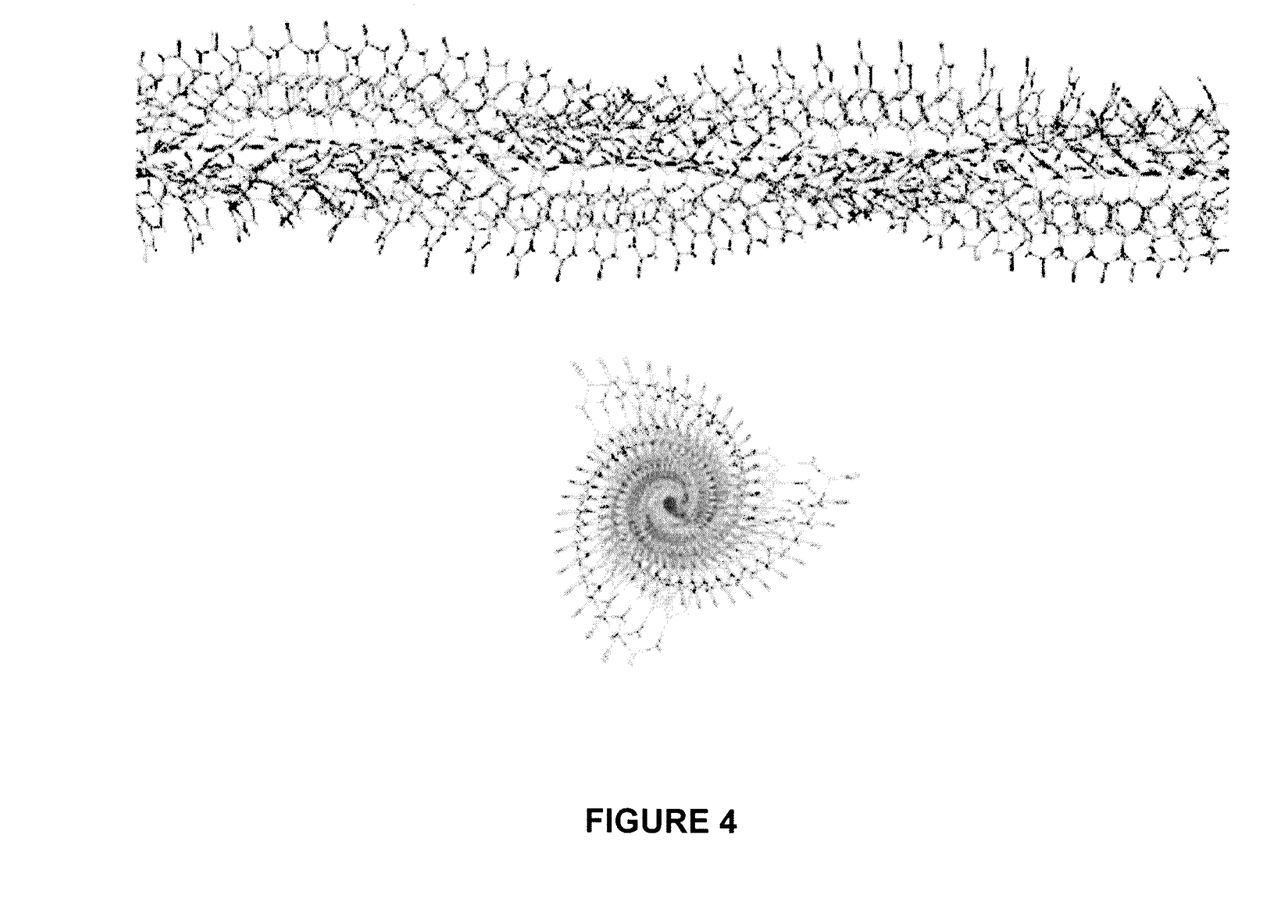
FIG. 4 shows a simulated packing structure of three polymers of polysulfoneurea, in an embodiment of the present invention.

Aramids have highly oriented molecular chains along the fiber axis, resulting in a high cohesive energy density, which is in large measure responsible for the fiber strength. FIG. 4 shows a simulated packing structure of three polymers of polysulfoneurea, in an embodiment of the present invention.

Kevlar®, a para-aramid synthetic fiber, is the most commonly known aramid fiber material in the United States. Without taking hydrogen bonding and crystallinity into account, using the method of Small (Small. 1953) and Fedor (Fedor, 1974) cohesive energy densities were estimated for the currently disclosed polyurea at 277 cal/cc, para-aramid synthetic fibers at 252 cal/cc. 256 for PPID and 255 for PBO. This demonstrates that the currently disclosed polyurea fiber will be significantly stronger than these other performance fiber materials. Aromatic polyurethanes, aramids and polyureas all tend to form well defined crystalline ribbons and fibers.

Example 3

A number of molecular models were constructed using a software package developed by Accelrys—Materials Studio to simulate polymer structure and properties. Table 2 lists estimates of selected physical and mechanical properties of polyurea materials of the present invention, compared with other commercial polymers. The calculations are performed by drawing the repeat unit then instructing the program to calculate the properties of a polymer with that repeat unit with a molecular weight of 10,000.

The data indicate that levels of several predicted mechanical properties correlate well with the hydrogen bond density of the polymer, which is a significant component of its cohesive energy density. These cohesive energy densities were calculated as the potential mass of hydrogens capable of forming hydrogen bonds, divided by the molar volume of the polymer.

Figure 5:
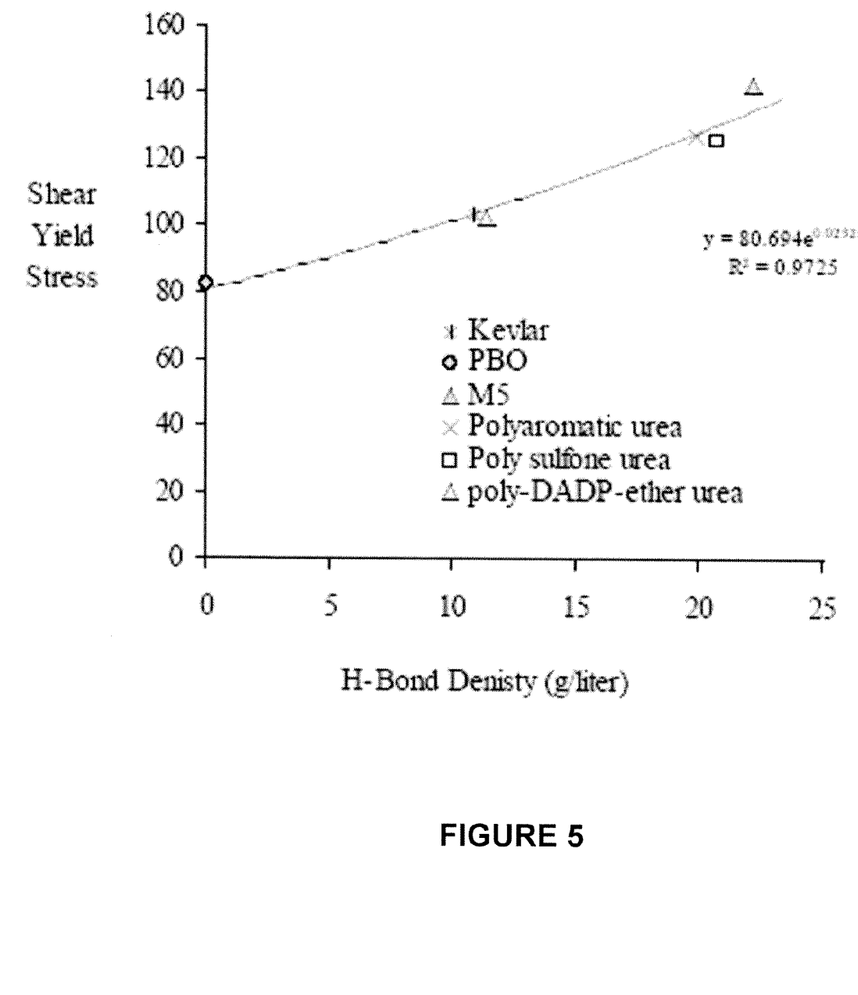
FIG. 5 shows the calculated effect of hydrogen bond density on shear yield of several high performance polymers, including a polyaromatic urea, and a polysulfoneurea and poly-DADP-ether urea, in embodiments of the present invention.

FIG. 5 shows the calculated effect of hydrogen bond density on shear yield of high performance polymers including sulfone- and ether-bridged polyurea polymers. The calculations were made with a torsional backbone angle of 180 degrees.

TABLE 2

Estimates of Physical and Mechanical Properties of Polyurea Polymer Materials of the Present Invention, and Other Commercial Polymers

| Property | Units | Kevlar | PBO | M5 | Aromatic Urea polymer PPDI + PPDA | Poly-sulfone urea PPDI + DADPS | Poly-DADP-ether urea PPDI + DADPO |
|---|---|---|---|---|---|---|---|
| Repeat unit MW | amu | 119 | 234 | 265 | 134 | 274 | 226 |
| Active H-bonds | number | 1 | 0 | 4 | 2 | 4 | 2 |
| H-bond Density | g/liter | 11 | 0 | 22 | 20 | 21 | 11 |
| Cohesive Energy | kJ/mol | 65 | 88 | 153 | 91 | 158 | 125 |
| Cohesive Energy Density | $J/cm^3$ | 702 | 526 | 847 | 902 | 818 | 710 |
| Temp. 1/2 Decomp. | °C. | 515 | 657 | 517 | 427 | 508 | 424 |
| Molar Volume | $cm^3/mol$ | 92 | 166 | 181 | 101 | 194 | 176 |
| Density | $g/cm^3$ | 1.29 | 1.41 | 1.47 | 1.33 | 1.42 | 1.28 |
| Solubility Parameter | $\sqrt{(J/cm^3)}$ | 26 | 23 | 29 | 30 | 29 | 27 |
| Bulk modulus | MPa | 7,951 | 6,396 | 10,463 | 9,809 | 8,407 | 7,166 |
| Shear modulus | MPa | 1,300 | 1,030 | 1,794 | 1,592 | 1,590 | 1,292 |
| Young's modulus | MPa | 3,698 | 2,931 | 5,090 | 4,531 | 4,487 | 3,656 |
| Shear yield stress | MPa | 104 | 82 | 143 | 127 | 126 | 102 |
| Brittle fracture stress | MPa | 175 | 183 | 169 | 177 | 141 | 147 |
| Perm. O2 | Dow units | 0.1290 | 58 | 0.0006 | 0.0044 | 0.0181 | 0.1003 |
| Perm. N2 | Dow units | 0.0187 | 14 | 0.0001 | 0.0005 | 0.0022 | 0.0143 |
| Perm. CO2 | Dow units | 0.3127 | 245 | 0.0009 | 0.0079 | 0.0367 | 0.2379 |

Example 4

High modulus fibers, such as PpPTA, PBO, PBT, and PIPD are spun from lyotropic, or liquid crystal, solutions of the polymer. In particular, production of para-aramid synthetic fibers utilizes calcium chloride to occupy hydrogen bonds of the amide groups during polymerization, and N-methyl pyrrolidone (NMP) to dissolve the aromatic polymer as it forms. This invention by Akzo was the first practical means of dissolving the polymer and restricting the polymer chains from entangling due to hydrogen bonding. Next, fibers are spun from a solution of the polymer in pure sulfuric acid, which accounts in part for the high cost of para-aramid synthetic fibers and similar fibers.

In contrast, the polymer formation reaction of the present invention proceeds very quickly upon mixing the two reagents, involving direct addition between isocyanate and amine groups, with no by-product. Therefore, fibers of this material can be reactively extruded directly, without the use of aggressive solvents, as with the encumbered production of aramid fibers.

Figure 6:
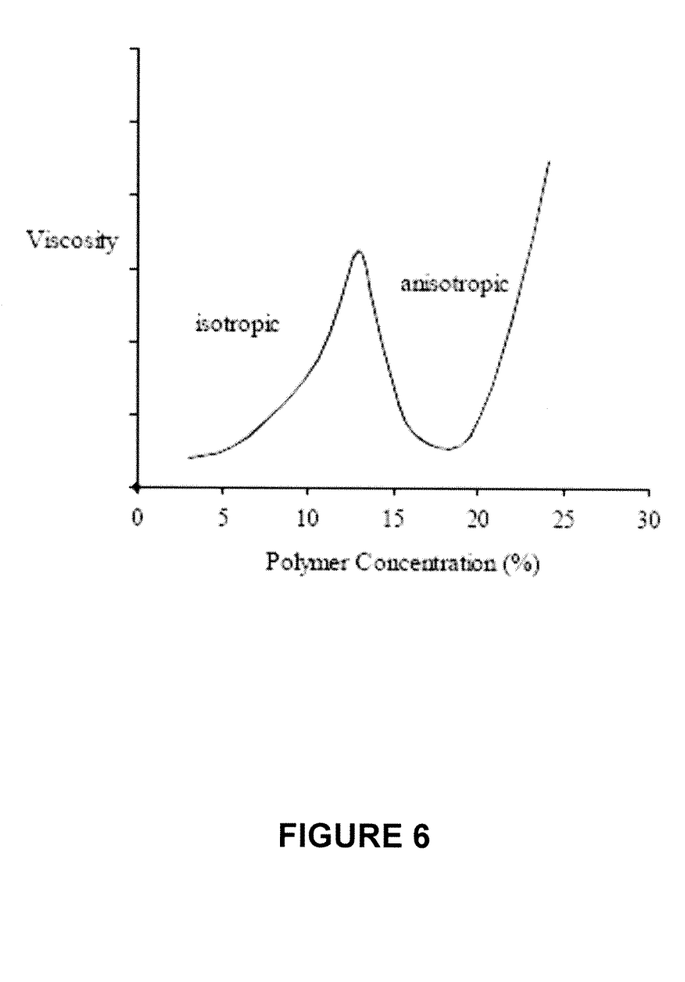
FIG. 6 shows the known effect of aramid polymer concentration on solution viscosity lead to lyotropic behavior that is utilized in spinning para-aramid synthetic fibers from pure sulfuric acid.
Figure 7:
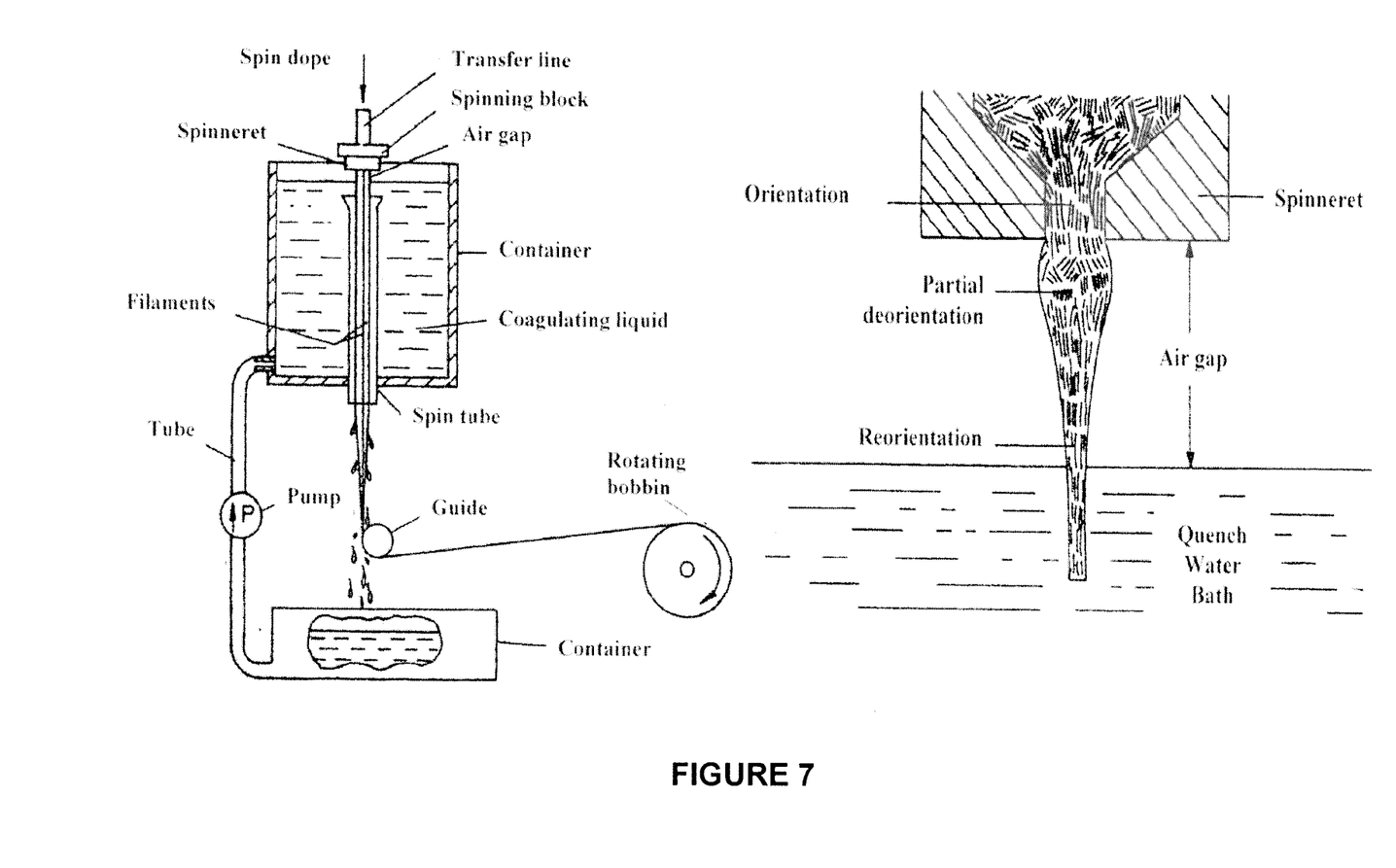
FIG. 7 shows an example of air gap wet spinning (left), with the air gap magnified (right)

FIG. 6 shows the effect of aramid polymer concentration on solution viscosity leading to lyotropic behavior that is utilized in spinning para-aramid synthetic fibers from pure sulfuric acid. FIG. 7 shows an example of a process and apparatus for air gap wet spinning (left), with the air gap magnified (right).

Figure 8:
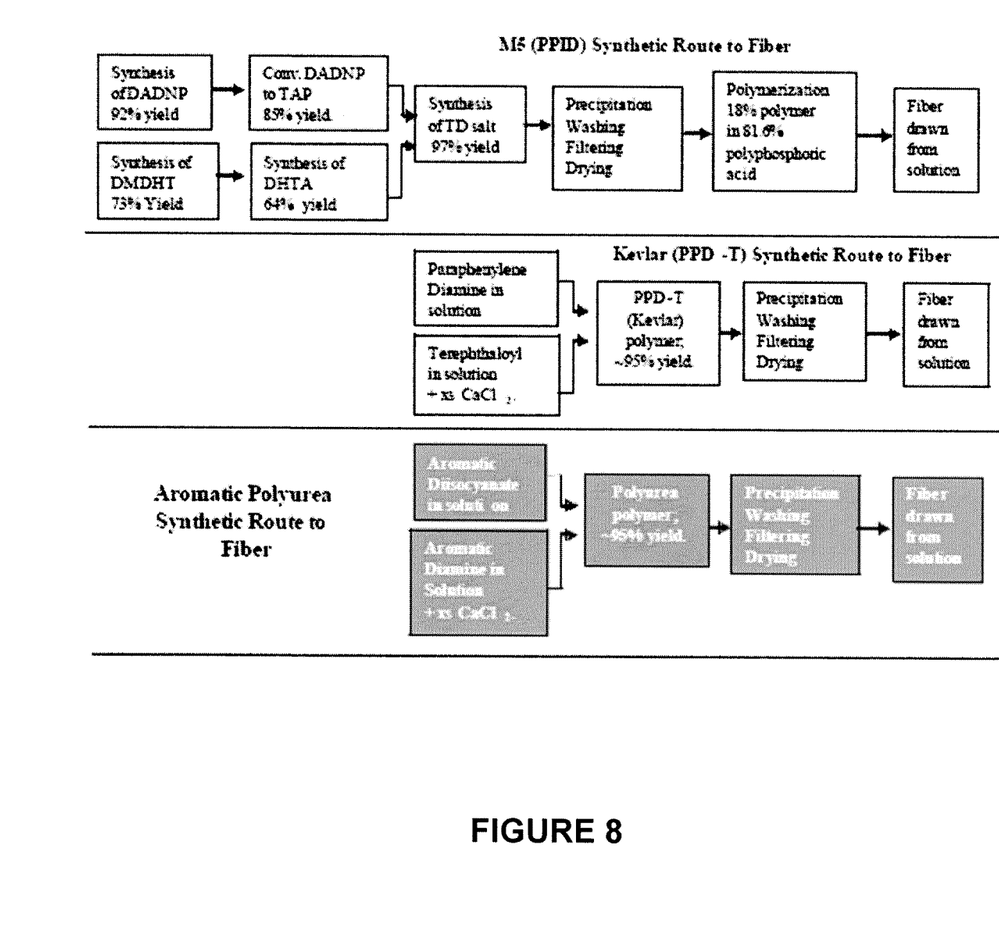
FIG. 8 shows a comparison of synthetic routes for several fibers, including PPID, para-aramid synthetic fibers, and aromatic polyurea.
Figure 9:
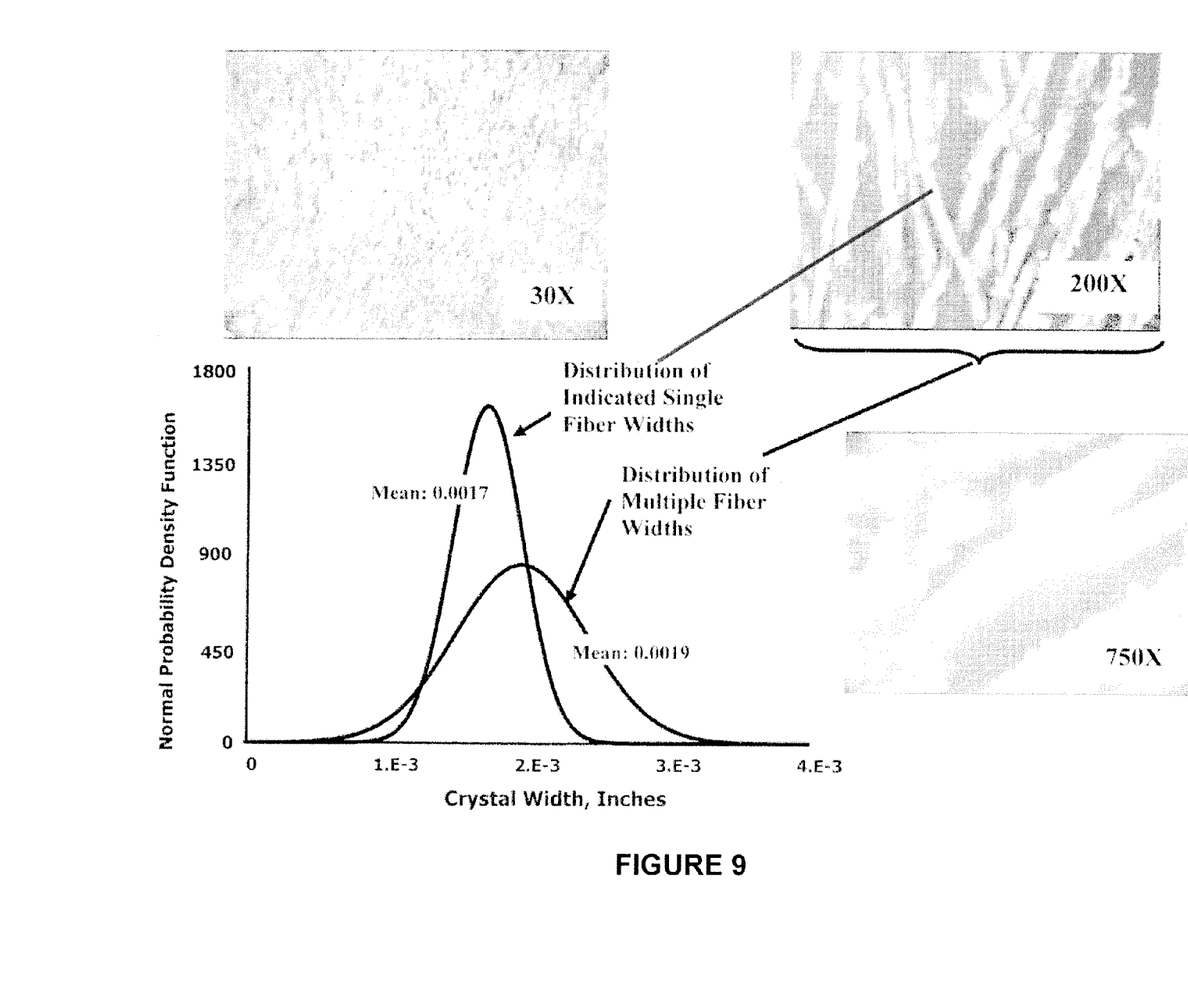
FIG. 9 shows photomicrographs of polymer fibers in an embodiment of the present invention, spontaneously formed by reaction precipitation of p-diphenyl diisocyanate and p-diphenyl diamine. Mean crystal widths were 0.0019 inch, coefficient of variation was 26%; conservative estimate of aspect ratio was much greater than 30.

FIG. 8 shows a comparison of synthetic routes for several fibers, including PPID, para-aramid synthetic fibers, and aromatic polyurea. FIG. 9 shows photomicrographs of polymer fibers in an embodiment of the present invention, spontaneously formed by reaction precipitation of p-diphenyl diisocyanate and p-diphenyl diamine. Mean crystal widths were 0.0019 inch, coefficient of variation was 26%; conservative estimate of aspect ratio was much greater than 30.

REFERENCES CITED

The following references, to the extent that they provide exemplar) procedural or other details supplementary to those set forth herein, are specifically incorporated herein by reference.

U.S. Patent Documents

U.S. Pat. No. 3,767,756, issued on Oct. 23, 1973, with Blades listed as the inventor.
U.S. Pat. No. 3,869,429, issued on Mar. 4, 1975, with Blades listed as the inventor.

Non-Patent References

O'Neill, Joseph M., "Factors Contributing to the Degradation of Poly(P-Phenylene Benzobisoxazole) (PBO) Fibers Under Elevated Temperature and Humidity Conditions," Thesis, Texas A&M University, August, 2006.

Sheth, J. P., Klinedinst, D. B., Wilkes, G. L, Yilgor, I., and Yilgor, E., "Role of chain symmetry and hydrogen bonding in segmented copolymers with monodisperse hard segments," *Polymer* 46: 7317-7322, 2005.

Small, P. A. "Some factors affecting the solubility of polymers," *J. Appl. Chem.* 3: 71-80, 1953.

Fedor, R. F. "A Method for Estimating Both the Solubility Parameters and Molar Volumes of Liquids," *Polym. Eng. and Sci.* 14(2): 147-154, 1974.

What is claimed:

1. A polyureasulfone polymer comprising:
   units of paraphenylene-diisocyante (PDI) and diaminodiphenylsulfone (DADPS) linked fiber, wherein the polyureasulfone polymer includes n units of paraphenylene-diisocyaante (PDI) and diaminodiphenylsulfone (DADPS), wherein n has a value greater than 200.

2. The polyureasulfone polymer of claim 1, wherein the units of paraphenylene-diisocyante (PDI) and diaminodiphenylsulfone (DADPS) are alternating.

3. The polyureasulfone polymer of claim 1, wherein the polyureasulfone polymer includes n units of paraphenylene-diisocyante (PDI) and diaminodiphenylsulfone (DADPS), wherein n has a value greater than 270.

4. A polyureasulfone polymer comprising the following structure:

wherein the polyureasulfone polymer has n units of par-aphenylene-diisocyante (PDI) and diaminodiphenylsul-fone (DADPS), wherein n has a value greater than 200.

* * * * *